Sept. 6, 1927.  E. A. JOHNSTON ET AL  1,641,813
TRACTOR
Filed Nov. 12, 1921   6 Sheets-Sheet 6
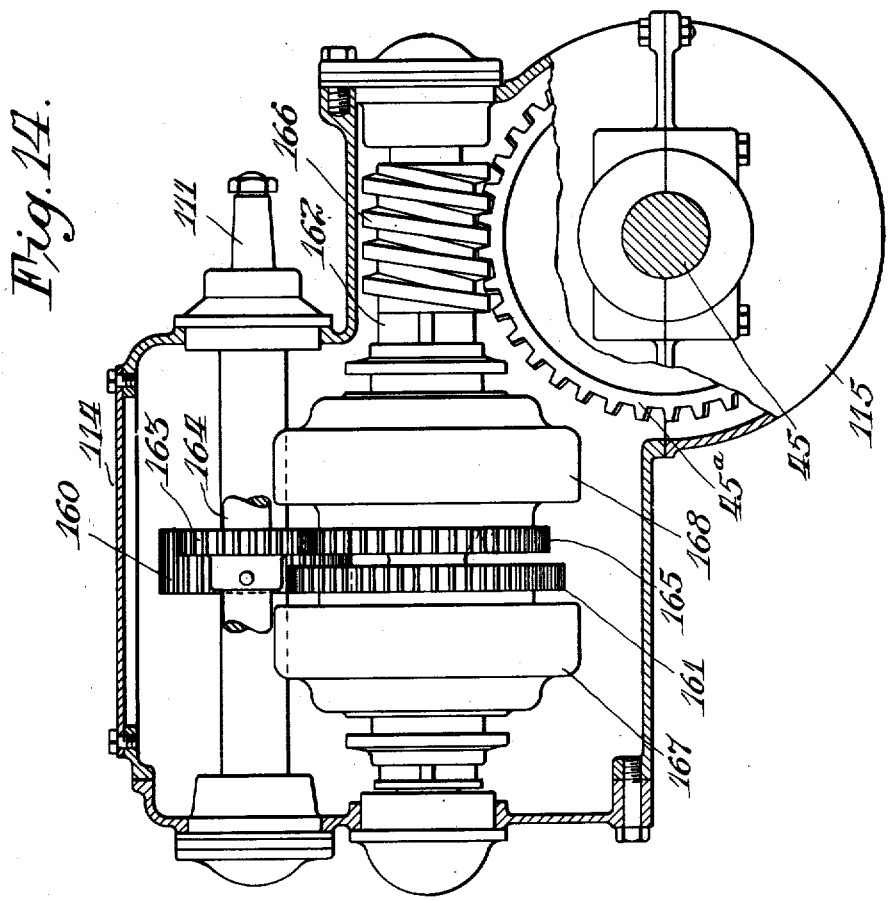
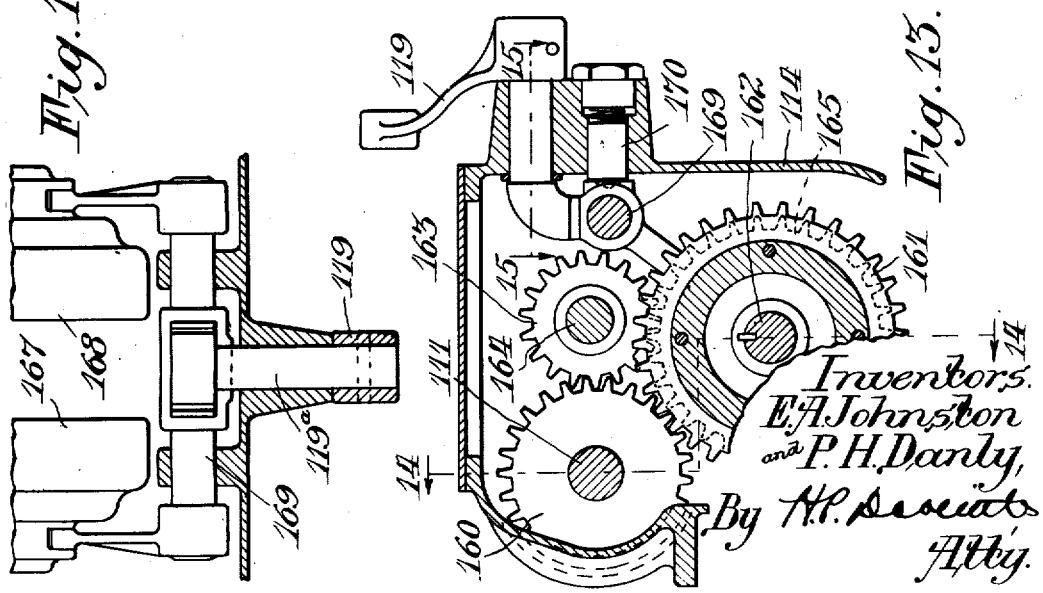
Inventors.
E. A. Johnston
and P. H. Danly,
By H. P. Associate
Atty.

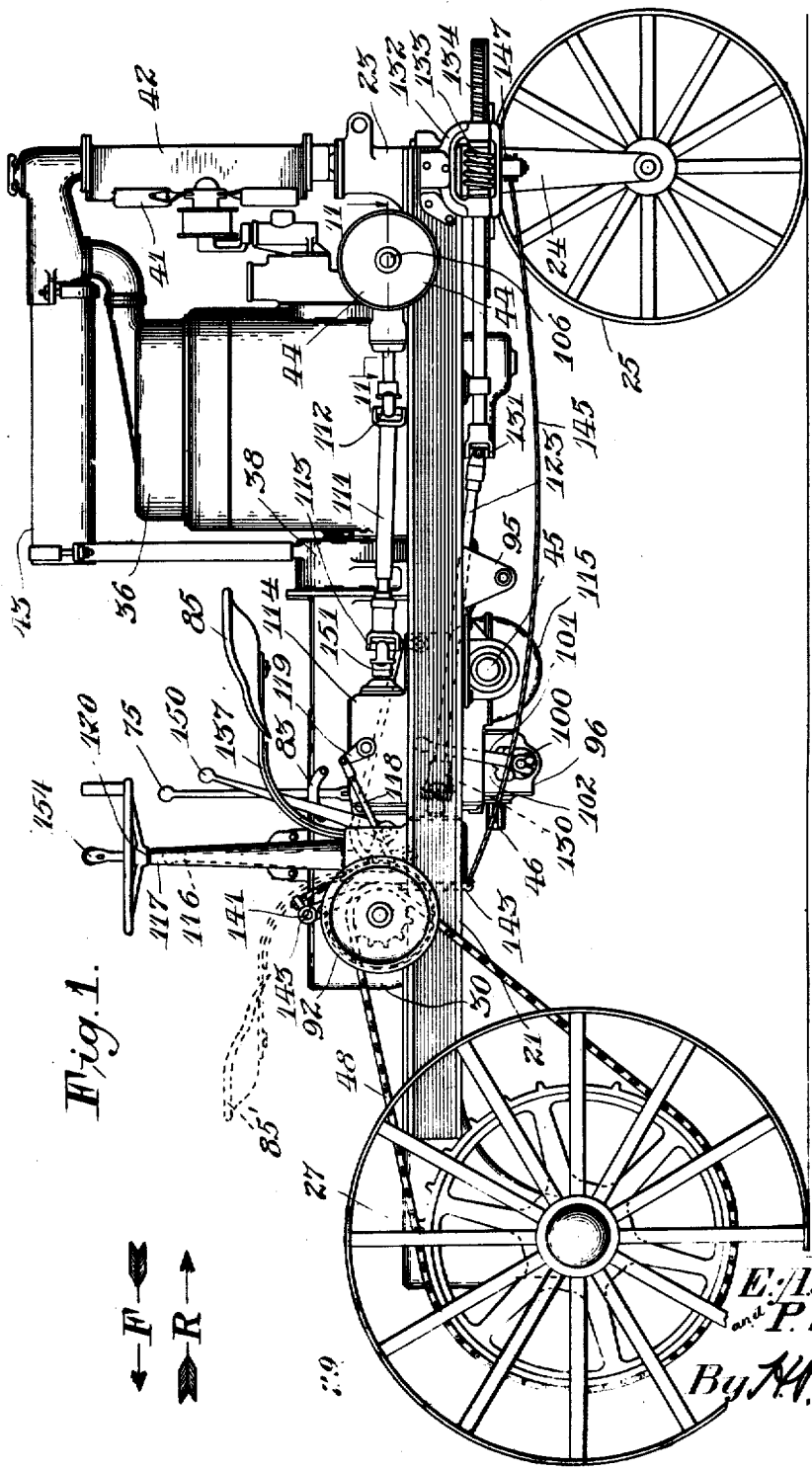

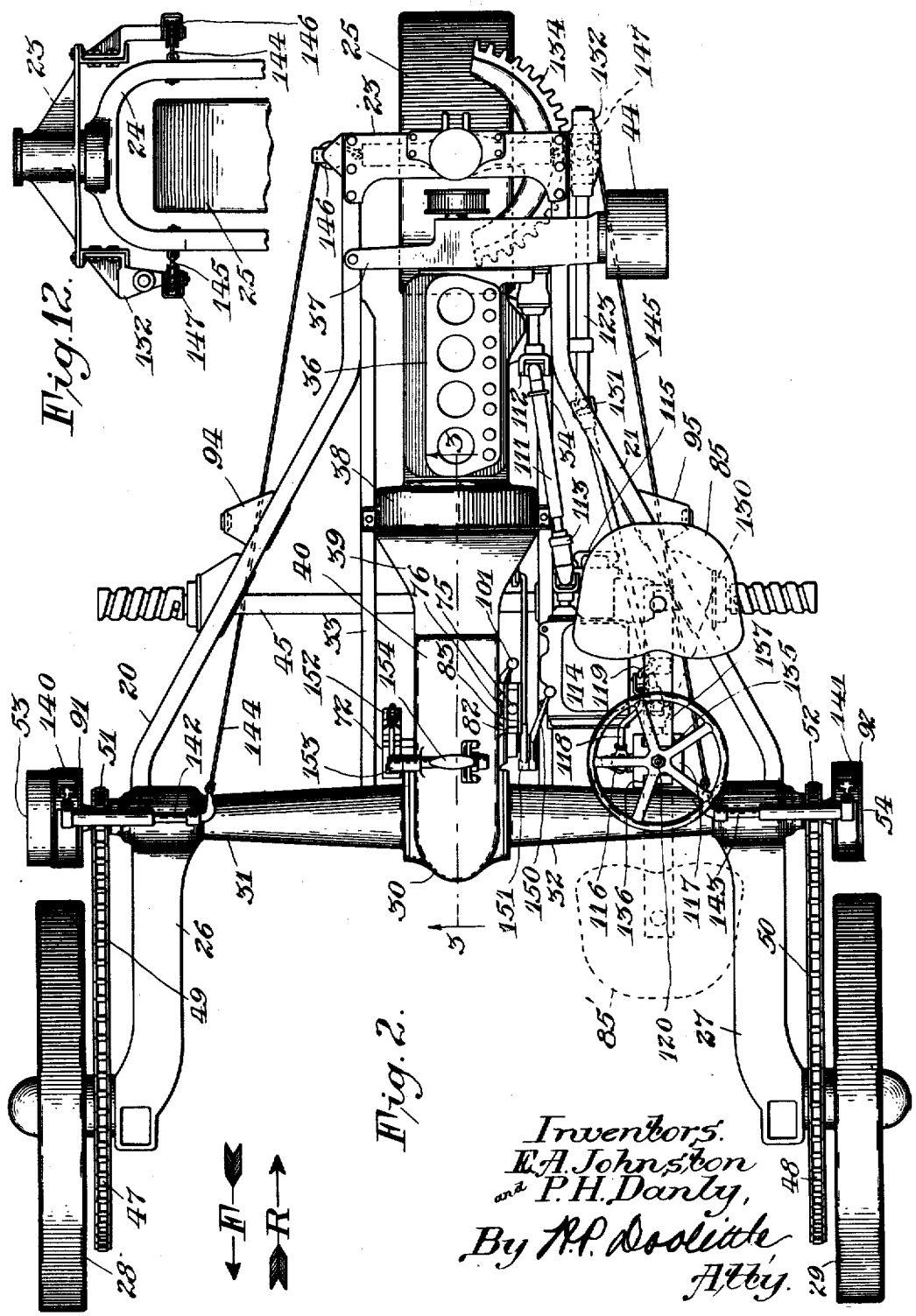

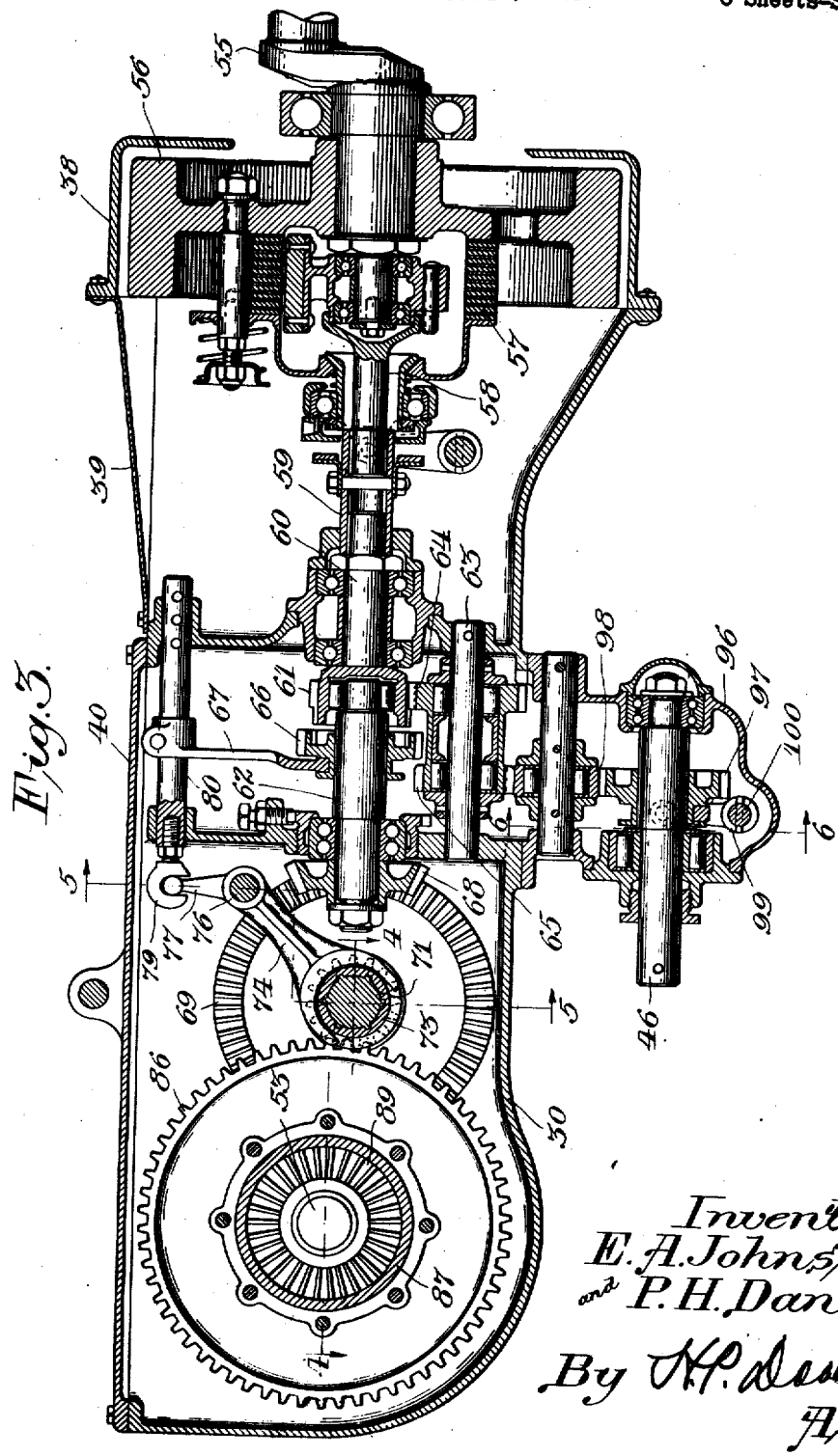

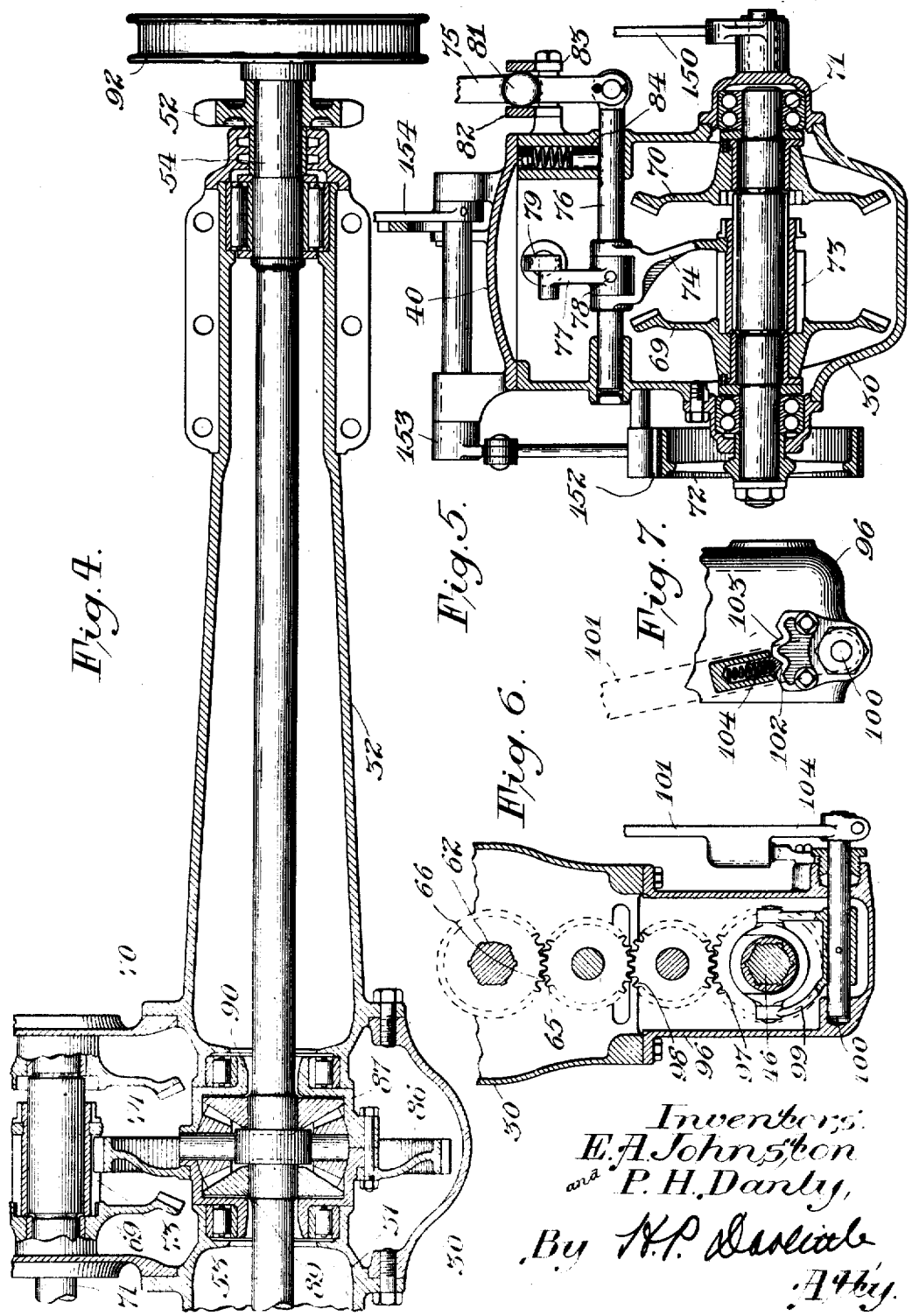

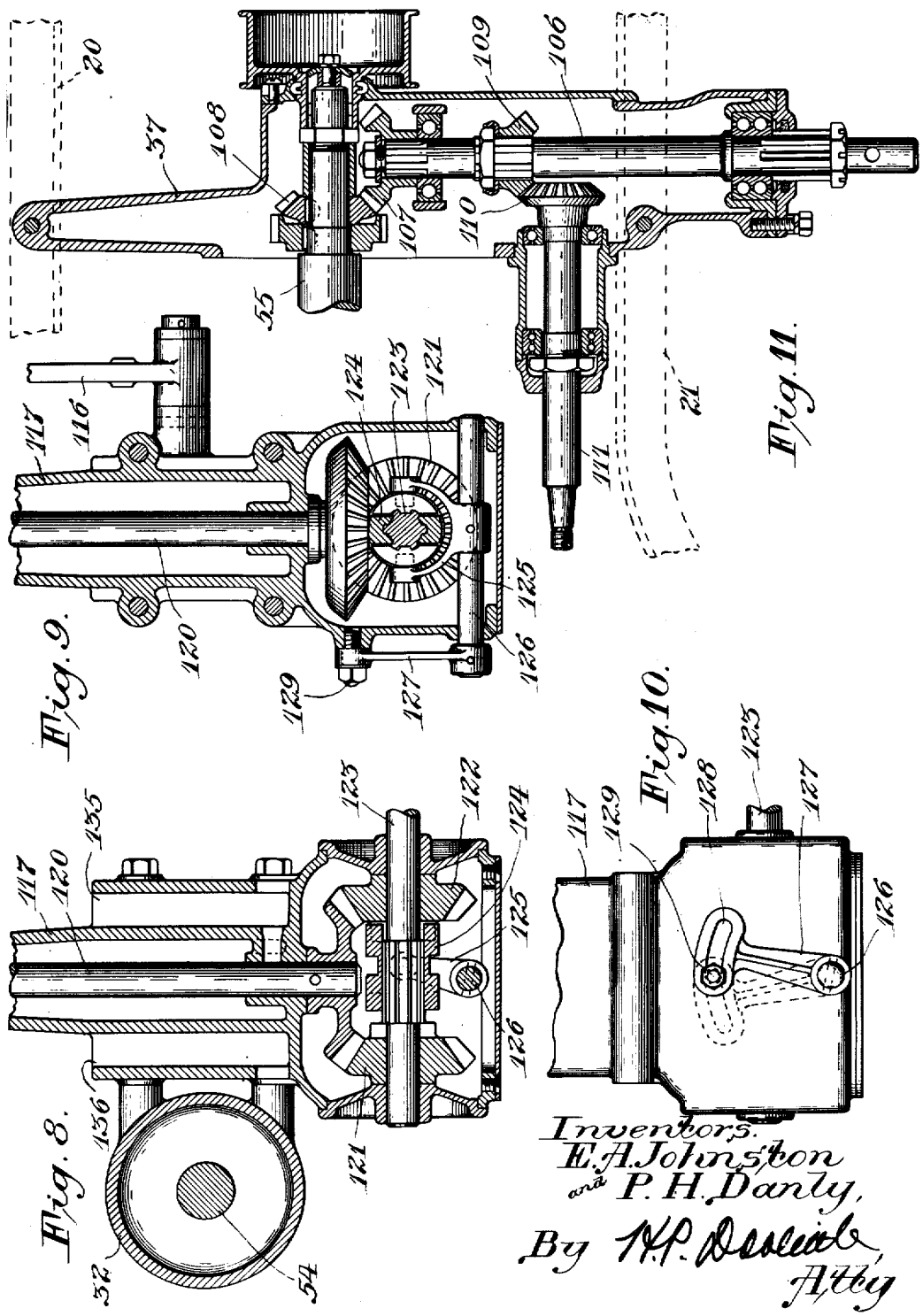

Patented Sept. 6, 1927.

1,641,813

UNITED STATES PATENT OFFICE.

EDWARD A. JOHNSTON AND PHILO H. DANLY, OF CHICAGO, ILLINOIS, ASSIGNORS TO INTERNATIONAL HARVESTER COMPANY, OF CHICAGO, ILLINOIS, A CORPORATION OF NEW JERSEY.

TRACTOR.

Application filed November 12, 1921. Serial No. 514,516.

Our invention relates to tractors, and particularly to tractors of the three-wheel type which are adapted for use with a wide variety of power driven agricultural implements and for general traction and power purposes.

An object of our invention is to increase the stability of tractors of this type, increase their rigidity and strength, decrease their cost of production and at the same time render their operation easier and extend their range of usefulness.

Another object is to improve and simplify the driving and steering means of a tractor so as to increase its tractive effort and reduce its turning radius to a minimum.

A further object is to provide a combined differential and steering means for driving and steering the traction wheels of the machine.

The above and other objects are attained by the tractor illustrated in the accompanying drawings, in which—

Figure 1 is a side elevation of a tractor embodying our invention;

Figure 2 is a plan view thereof;

Figure 3 is a longitudinal sectional view of the transmission and reversing mechanism taken substantially on the line 3—3 of Figure 2.

Figure 4 is a sectional view of the differential end brakes for steering the driving wheels of the tractor, the section being taken on the line 4—4, Figure 3.

Figure 5 is a vertical sectional view of the forward and reverse driving gears taken on the line 5—5 of Figure 3.

Figure 6 is a section on line 6—6, Figure 3, showing the power take-off for driving an implement.

Figure 7 is a detail of the mechanism shown in Figure 6.

Figures 8, 9 and 10 are details of the reversible hand steering mechanism.

Figure 11 is a section on the line 11--11, Figure 1, showing the belt pulley and implement adjusting drives.

Figure 12 is a detail of the rear fork showing the steering cables connected thereto.

Figure 13 is a transverse vertical section through a casing at one side of the machine containing the drive mechanism for the implement lifting shaft.

Figure 14 is a longitudinal section through that casing on line 14—14 of Figure 13 exposing the gearing contained therein.

Figure 15 is a detail section on line 15—15 of Figure 14.

In the following description of our tractor, we shall refer to the front and rear ends and forward and reverse drive, forward drive being considered to be in the direction indicated by the arrow F and reverse drive in the direction of the arrow R, Figures 1 and 2. However, these terms are adopted only for convenience in description and are not to be considered as limitations, since the tractor is designed for equally efficient operation in either direction.

Referring to Figures 1 and 2, our tractor comprises an elevated main frame formed from channels 20, 21 secured at their rear ends to a casting 23 provided with a vertical bearing in which the upper end of the fork 24 is journaled. The arms of the fork extend downwardly and at their lower ends carry the wheel 25 which supports one end of the tractor and is adapted to be angled about the vertical axis of the fork for normally steering the tractor. The channels 20, 21. are secured at their front ends to castings 26, 27 constituting depending side members of the frame having laterally projecting axles on which the drive or traction wheels 28, 29 are secured. A transversely extended frame member comprising a casing 30 and oppositely extending hollow arms 31, 32 is rigidly secured to the front ends of the channels and to the side members 26, 27 and forms a part of the tractor frame to which the front ends of the channel bars 33, 34 are secured, their rear ends being secured to the channels 20, 21. Mounted centrally on the frame is an internal combustion engine 36 supported at one end on the channels 20, 21, by a casting 37, and at the other end by the flywheel housing 38 secured to the bars 33, 34. The flywheel housing is secured to the differential and transmission casing 30, the open upper side of the latter being closed by removable covers 39, 40, to provide access to the enclosed mechanism. The engine is provided with the usual cooling fan 41, radiator 42 and fuel tank 43, as shown in Figure 1, these parts being omitted from Figure 2 in order to show parts that would otherwise be concealed. In addition to propelling the tractor, the engine 36 has connections for driving the belt pulley 44, implement lifting or adjusting shaft 45, and implement driving shaft 46, as will be explained later.

The traction wheels 28, 29 carry sprockets 47, 48 respectively, engaged by driving chains 49, 50 which are driven by sprockets 51, 52 keyed to the differential shafts 53, 54. The differential shafts are journaled in bearings in the hollow arms 31, 32 and are driven from the engine thru the transmission, reversing and differential mechanism now to be described, which forms the subject matter of our Patent No. 1,523,482, January 20, 1925, divided from this application.

*Tractor driving mechanism.*

Referring to Figure 3, the engine has a crank shaft 55 to which is keyed the flywheel 56 carrying alternate disks of a multiple disk clutch 57, the other disks being carried by the clutch shaft 58, as is usual in the art. The clutch shaft is connected by a sleeve 59 to the driving shaft 60 of the transmission. The shaft 60 is rotatably supported in ball bearings in the housing 30 and at its end opposite the clutch carries a spur gear 61 which also forms one element of a clutch for direct or high speed drive of the driven shaft 62. A short fixed shaft 63 is mounted in the casing and rotatably mounted thereon are two gears 64, 65, which may be integrally formed as shown, or otherwise rigidly secured together. Gear 64 meshes with gear 61 and is continuously driven thereby, which gear 65 is adapted to mesh with a gear 66 splined to the shaft 62. The gear 66 also provides the second element of the clutch by cooperating with gear 61. The gear 66 has a groove formed therein in which the lower forked end of a shipper arm 67 engages for sliding the gear on the shaft 62. As shown in Figure 3, the gear 66 is in neutral position and the transmission is at rest. When the gear 66 is shifted to the left or into mesh with gear 65, the shaft 62 will be driven at first or low speed through gears 61, 64 and 65, 66, and when it is shifted to extreme right position the clutch element thereon engages the clutch element on gear 61 for direct or high speed drive of the tractor. At its forward end the driving shaft 62 carries a bevel gear 68 meshing with a pair of bevel gears 69, 70 (Figures 4 and 5) journaled on the countershaft 71, which is rotatably mounted in the side walls of the casing 30, one end extending beyond the casing and carrying a brake drum 72 for stopping the tractor. Splined on the shaft 71 between the bevel gears is a pinion 73 having a wide face and formed with a clutch element at each end adapted to cooperate with corresponding clutch elements formed on the bevel gears for driving the shaft 71 in opposite directions. The pinion 73 has a groove near one end in which the fork of a shipper arm 74 engages for sliding the gear on the shaft. It will be seen that the gear 68 may be driven at two different speeds from the engine and that it in turn rotates the gears 69, 70 in opposite directions, and that consequently the pinion 73 has two speeds forward and the same number reverse.

The pinion 73 and the gear 66 are shiftable by a single lever 75 as will now be described. The arm 74 is forked at its upper end and bored to rotatably receive the shaft 76, which is rotatably and slidably mounted in bearings in the casing 30. A T-shaped arm 77 (Figure 5) is secured by a pin 78 to the shaft 76 within the fork on the arm 74 so as to both slide and rotate with the shaft. The bar at the upper end of the arm 77 is circular in cross section (Figure 3) and slidably engages in a recessed member 79 which is adjustably secured in one end of a bar 80 slidably mounted in the casing and carrying the shipper arm 67. The lever 75 is secured at its lower end to one end of the shaft 76 so that fore and aft movement of the lever will oscillate the shaft about its axis, while lateral movement of the lever will shift the shaft longitudinally. The lever 75 has a ball 81 which engages between a pair of smooth sectors 82 and 83 secured to the side of the casing 30. These sectors guide the lever in its forward and reverse movement and provide a fulcrum for the ball of the lever when it is shifted laterally, as will be apparent from an inspection of Figures 1, 2 and 5. Referring to Figure 5, the shaft 76 has three notches or recesses adapted to be engaged by a spring pressed detent 84, and in Figure 3, the bar 80 is provided with three similar recesses adapted to be engaged by a similar detent. When the gear shift lever is in neutral position, the detents engage in the central notch in each shaft and the gear 66 occupies a position intermediate the gears 61 and 65 as shown in Figure 3, while the gear 73 will be out of engagement with both gears 69 and 70. Assume that the engine is running and the operator, occupying the seat 85, Figure 2, desires to start the tractor in a forward direction. After disengaging the main clutch 57 he grasps the upper end of the lever 75, shifting it laterally toward the seat, or to the left, which moves the shaft 76 longitudinally and engages the pinion 73 with gear 69. The lever is then shifted forwardly which rocks the shaft 76 on its axis and through arm 77, bar 80 and shipper 67 slides gear 66 into mesh with gear 65. The main clutch is then released and the tractor starts forwardly at first on low speed. The lever 75 is then shifted to the rear, disengaging gears 66 and 65 and engaging gears 66 and 61 to drive the tractor at high speed. Similarly, to drive the tractor in the reverse direction, the lever 75 is first moved laterally to the right, or away from the operator, to engage gears 73 and 70, after which the lever 75 is shifted in the same manner as before to secure low and high speeds. It will thus be seen that we are enabled to control an equal number of speeds of the tractor both forward and reverse by a single operating element.

The pinion 73 meshes with the bull gear 86 which is secured to the differential cage 87 carrying differential pinions meshing with the differential gears 89, 90 mounted on the inner ends of shafts 53, 54 respectively. The shafts 53, 54 carry the driving sprockets 51, 52 as previously described and at their outer ends adjacent the sprockets are provided with brake drums 91, 92 which form part of a steering means to be described later.

Implement driving mechanism.

The implement driving or power take-off shaft 46 is provided for power drive of an implement propelled by the tractor, which implement will as a rule be supported on a supplemental frame (not shown) pivotally connected at its rear end to brackets 94, 95 secured to the sides of the main frame. This supplemental frame has been omitted to avoid needless complication of the drawings and since it per se forms no part of the present invention. The shaft 46 is supported on bearings in a supplemental casing 96 bolted or otherwise secured on the under side of casing 30 and this shaft is, therefore, located in a horizontal plane below the level of the frame and at a point between the traction wheels where it is readily accessible and in best position for affording direct drive to the connected implements above referred to. Shaft 46 has a gear 97 splined thereon. The gear 97 is adapted to be shifted into and out of mesh with a gear 98 rotatably mounted on a fixed shaft in the supplemental casing and meshing with the transmission gear 65. The gear 97 is engaged by a shipper 99 fixed to the shaft 100. One end of the shaft 100 extends beyond the casing and carries an actuating lever 101 by means of which the shaft is oscillated to slide the gear 97 into and out of mesh with gear 98 for controlling operation of the implement driving shaft 46. Secured to the casing 96 adjacent the lower end of lever 101 is a segment having two notches 102, 103 adapted to be engaged by a yieldable detent 104 carried by the lever. (See Figs. 6 and 7.) When the detent engages in the notch 102, the lever 101 will be in its forward position and gears 97 and 98 in mesh. Correspondingly, when the lever is moved rearwardly, the detent will engage in notch 103 with the gears out of mesh and the shaft 46 inoperative.

Belt pulley driving and implement adjusting mechanism.

Referring to Figs. 2 and 11, the casting 37 which supports one end of the engine on the main frame has journaled therein a shaft 106 which extends beyond the casting and carries the belt pulley 44, the pulley being omitted from Fig. 11. The shaft 106 is driven by a bevel gear 107 meshing with a similar gear 108 on the crank shaft 55. Intermediate its ends the shaft 106 has an adjustably mounted bevel gear 109 driving a gear 110 secured to a shaft 111 journaled in bearings in the casting 37. The shaft 111 has a pair of universal joints 112, 113 (Figs. 1 and 2), and extends forwardly to the clutch and gear housing 114. The implement adjusting shaft 45 extending transversely of the main frame has a worm wheel 45ª within the casting 115 which is adapted to be driven in either direction, and held in any position of adjustment by means of the clutch and gearing in the housing 114. Within the casing 114 the shaft 111 has a wide spur gear 160 fixed on it. This gear is in mesh with a gear 161 journaled on a worm shaft 162 carried in bearings in the casing 114 and is also in mesh with an intermediate gear 163 secured on a counter shaft 164 in the casing. Gear 163 is in mesh with a second gear 165 also journaled on worm shaft 162. Worm shaft 162 has fixed to it a worm 166 in mesh with the worm wheel 45ª. This gear arrangement provides reversely driven gears 161, 165 on the worm shaft 162. For locking either of these gears to the shaft there are provided opposite clutches 167, 168 splined on the worm shaft 162. These clutches are shifted by means of forks on the ends of a sliding shaft 169 which is provided with a rack cooperating with a complemental rack on the end of rock shaft 119ª, as best seen in Figures 13 and 15. A spring pressed detent 170 engages seats in the sliding shaft 169 to retain it in each of its three adjusted positions. The mechanism described provides for transmitting rotation to the implement raising shaft 45 in either direction when desired. This mechanism is controlled by the lever 116 mounted on the steering post 117 (Figs. 1, 2 and 9). The lever 116 is connected to one end of a link 118, the other end of which is connected to an arm 119 mounted on a shaft 119ª extending into the housing 114 to control the clutches.

Hand steering mechanism.

The steering column 117 is mounted near the forward end of the tractor on the arm 32 of the casing 30 (Figs. 1, 2 and 8). The column carries the usual hand wheel secured to the upper end of a vertical shaft 120 extending through the column, and at its lower end having a bevel gear meshing with a pair of bevel gears 121, 122 rotatably mounted on a steering shaft 123 journaled in the lower end of the steering column. A clutch member or sleeve 124 splined to the shaft has clutch elements on each end adapted to engage corresponding elements on the respective bevel gears 121, 122. The sleeve 124 has a central groove engaged by a forked arm 125 secured to a shaft 126. An arm 127 having a slot 128 is secured to one end of the shaft, and adapted to oscillate it to shift the sleeve 124. A stud 129 secured to the column engages in the slot, and is adapted to lock the arm 127 in either extreme position, and thus retain the sleeve in engagement with the corresponding gear 121 or 122. The steering shaft 123 is provided with one or more universal joints 130, 131, and extends to the rear of the tractor, where it is journaled in a bracket 132 bolted to the channel 21 (Figs. 1 and 2). A worm 133 keyed to the steering shaft meshes with a sector 134 secured to the fork 24. Rotation of the hand wheel will, through the shaft 120, gear 121 or 122, shaft 123, worm 133 and sector 134, angle or turn the fork 24 and wheel 25 about the vertical axis of the fork to normally steer the tractor.

Referring now to Figs. 1, 2 and 8, sockets 135 and 136 are provided on the front and rear sides of the steering post for the reception of the spring or support 137 of the seat 85. When the tractor is being driven in the direction of the arrow F, the seat will be supported in socket 135 and occupy the position shown in full lines. The hand steering wheel will then be in front of the operator, and the gear 122 connected to the steering shaft 123 so that when the operator wishes to turn the tractor to the right (for example) he will turn the hand wheel to the right, as is usual in the art. When the tractor is being operated in the reverse direction the seat will be supported in the socket 136, and will occupy the dotted line position 85', as shown in Figs. 1 and 2. Now, if the gear 122 remains clutched to the shaft 123, the hand wheel will have to be rotated to the left to make a right hand turn and vice versa. This would be very confusing to the operator, and would probably result in numerous accidents. Consequently, we have provided the gear 121, which rotates oppositely to gear 122, so that when the tractor seat is reversed the steering connections will be reversed and the relative direction of rotation of the hand wheel to make a turn in a given direction will remain the same.

Power steering mechanism.

The steering mechanism just described is hand operated, and is normally used to control the path of travel of the machine. However, there are times when it becomes desirable to turn the tractor on a very short radius, such, for example, as when cultivating corn, and it is necessary when reaching the end of a row to turn very sharply and enter between the next adjacent rows. To effect this short turning operation, we have combined a power steering device for the tractor wheels with the hand steering device just described. As previously stated, the differential shafts 53, 54 are provided with brake drums 91, 92 on their outer ends. Cooperating with each of these drums is a brake band 140, 141, the ends of which are secured to brake levers 142, 143 mounted in bearings on the arms 31, 32. These levers are somewhat offset or bent, as shown in Fig. 1, and extend below the casing arms 31, 32, where their free ends are secured to cables 144, 145, which extend rearwardly, and passing over sheaves 146, 147 are secured to opposite sides of the fork 24, as best shown in Fig. 12. The cables 144 and 145 are normally somewhat slack so that the brake bands will be loose on the drums, the slackness of the cables being somewhat exaggerated in Fig. 1 for clearness in illustration. Assume now that the tractor is being driven forwardly (Fig. 1) and the operator wishes to make a quick turn to the right, he will turn the handwheel to angle the yoke 24 and wheel 25 to carry the rear end of the tractor to the left, which will start the tractor turning to the right. As he continues to angle the yoke 24 it will pull the cable 144 over the sheave 146 until it becomes taut, and tightens the band 140 on drum 91. The effect of this will be to retard that side of the differential and tractor wheel 28 and accelerate the other side of the differential and tractor wheel 29, which will effect a quick turning movement of the tractor. Conversely the band 141 will be tightened on its drum when it is desired to make a quick turn to the left. The steering drums also operate similarly when the tractor is being driven in the opposite direction, as will be apparent.

The main clutch 57 previously referred to is controlled by the clutch lever 150 (Figs. 1, 2 and 5) mounted on one side of the casing 30. The lever 150 is a bell crank, its short arm being connected to one end of a bent link 151, the other end of which is connected in the usual manner to operate the clutch. When the lever occupies the position shown in Fig. 1, the clutch will be engaged. To disengage the clutch the lever is moved forwardly so that the short arm of the bell crank and the bent end of the link 151 pass below the line of centers and lock the clutch in released position.

In addition to the brake drums for steering the tractor, there is a drum 72 previously referred to for stopping the tractor when desired. The drum 72 is engaged by a band 152 connected to an arm 153 depending from a brake lever 154 mounted on the cover 40 of the casing 30, as best shown in Figs. 1, 2 and 3.

A tractor constructed as described will have as novel and outstanding features of its organization, an elevated frame, an implement driving shaft, implement attaching means, and implement adjusting means, all so located and arranged below the level of the frame and between the traction wheels as to afford a low, direct, central line drive for driven implements that may be used therewith, and having short turning means which, while modifying the drive of the traction wheels, does so without affecting the drive of the implement shaft.

It will thus be apparent that we have invented a reversible tractor that is convenient and easy to operate, adapted to a great number of useful operations, and capable of many modifications that will readily suggest themselves to those skilled in the art. While we have shown but one specific embodiment of our invention, it is to be understood that we desire to secure as our invention all modifications and equivalents thereof that may fall within the scope of the subjoined claims.

What we claim is:

1. In a tractor, the combination of a frame having longitudinally extending members on each side, an engine between the side members and having a crank shaft, a flywheel housing secured to the frame members and supporting one end of the engine, a casting secured to the frame members and supporting the other end of the engine, a laterally projecting belt pulley shaft journalled in the casting and driven from one end of the crank shaft, and transmission and differential mechanisms driven from the other end of the crank shaft.

2. In a tractor, the combination of a frame having longitudinally extending members on each side, an engine between said members and having a crank-shaft, a flywheel housing carried between said members and supporting one end of the engine, a casting secured to the members and supporting the other end of the engine, a laterally projecting belt pulley shaft journaled in the casting and driven from one end of the crankshaft, and a transversely extending implement adjusting shaft journaled on the frame members below the flywheel housing and adapted to be actuated through transmission mechanism driven by the belt pulley shaft.

3. In a tractor, the organization comprising longitudinal frame members, steerable supporting means for one end of said members, a transversely extended frame member secured to the other ends of said longitudinal frame members, wheel supports secured to the ends of said transverse frame member, traction wheels journaled on said supports on an axis below said members of the frame, a motor carried by the longitudinal frame members and having driving connections to the traction wheels including parts housed in the transverse frame member, an implement driving shaft mounted beneath the frame and driven from said motor and having a projecting end extending parallel with the longitudinal members at a point below the frame members and between the treads of the traction wheels, and an implement adjusting shaft driven from the motor independently of the implement driving shaft and mounted to extend transversely of the longitudinal frame members.

4. In a tractor, the organization comprising longitudinal frame members, steerable supporting means for one end of said members, a transversely extended frame member centrally secured to the other ends of said longitudinal frame members, wheel supports secured to the ends of said transverse frame member, traction wheels journaled on said supports on an axis below said members of the frame, a motor carried by the longitudinal frame members and having driving connections to the traction wheels including parts housed in the transverse frame member, an implement driving shaft mounted beneath the longitudinal members of the frame and driven from said motor and having an end projecting longitudinally thereof at a point below the frame members, implement frame connecting means secured to the tractor at each side of said implement driving shaft and located between the treads of the traction wheels, and a motor driven implement adjusting shaft mounted on the frame in position for connection to an implement frame received by said connecting means.

5. In a tractor, the organization comprising longitudinal frame members, steerable supporting means for one end of said members, a housing centrally secured to the other ends of said frame members and comprising a central casing and laterally extended hollow arms, said casing and arms providing a transverse frame member lying in a plane above the steerable supporting means, wheel supporting members secured to the ends of the hollow arms, a traction wheel journaled at the outer side of each supporting member on an axis below the frame members, an implement driving shaft mounted beneath the central casing in a plane below the frame members and above the horizontal plane in which the axis of the traction wheels lies and having a projecting end extending parallel to the longitudinal members of the frame, and power transmitting mechanism for the traction wheels and implement shaft including parts housed within said casing and hollow arms.

6. In a tractor, the organization comprising an elevated frame having spaced longitudinal members connected at one end to a transversely extended member, depending side members fixed to the respective ends of said transverse member, supporting wheels mounted on the depending members and on the other ends of the longitudinal members, means on the frame for driving certain of the wheels including a variable speed transmission contained in a casing mounted between the longitudinal members, a second housing secured to the under side of said transmission housing and forming a continuation thereof extending below the frame, and an implement driving shaft journaled in said second housing and driven through said transmission, said shaft having a free end projecting from its housing.

7. In a tractor, the organization comprising an elevated frame having spaced longitudinal members connected at one end to a transversely extended member, depending side members fixed to the respective ends of said transverse member, traction wheels mounted on the depending members and steering means mounted on the other ends of the longitudinal members, means on the frame for driving the traction wheels including a variable speed transmission contained in a casing mounted between the lingitudinal members adjacent the transverse member, a second housing secured to the under side of the transmission housing and extending below the frame, and an implement driving shaft journaled in said second housing and driven through said transmission, said shaft having a free end projecting from its housing on a line transverse to the axis of the traction wheels.

8. The combination with a tractor having an elevated ame structure consisting of longitudin , extending members connected at one end ) a transversely extended housing, steering means supporting the other ends of said members, depending side members on the respective ends of said housing, traction wheels on the depending portions of said side members, differentially driven shafts contained in said housing and geared to the traction wheels, and a variable speed transmission contained in a housing carried on said longitudinal frame members adjacent their connection to said housing; of implement connecting means at either side of the frame located below the longitudinal members and within the space between the depending side members, a second housing secured to the under side of said transmission housing and forming a continuation thereof below the frame, and an implement driving shaft journaled in said second housing and driven through said transmission, said shaft having a free end projecting from its housing on a line transverse to the axis of the traction wheels and midway between the implement connecting means.

9. The combination with a tractor having an elevated frame structure comprising a transverse member with depending side portions fixed to the ends thereof, traction wheels mounted on the outer sides of said side portions and means on the frame including a variable speed transmission for driving said wheels, of an implement driving shaft journaled in a frame on a horizontal plane below the transverse member of the frame and substantially midway between the depending side members thereof.

10. In a tractor, the organization comprising an elevated frame, traction wheels and steering means supporting the respective ends of the frame, the traction wheels being mounted on depending members fixed to the respective ends of a laterally extended portion of the frame, means on the frame for driving the traction wheels including a variable speed transmission and differentially driven shafts journaled in the laterally extended portion of the frame and geared to the traction wheels, braking means for each of the drive shafts, means for selectively braking either of the drive shafts through actuation of the steering means, an implement driving shaft located below the frame and midway between the traction wheels, and means for driving the implement driving shaft through a constantly rotated element of the transmission, whereby to effect short turns of the tractor without affecting the drive to the implement shaft.

11. In a tractor, the organization comprising an elevated frame, traction wheels and steering means supporting the respective ends of the frame, means on the frame for driving the traction wheels including a variable speed transmission and differentially driven shafts geared to the wheels, braking means for each of said drive shafts, an implement driving shaft located below the frame and driven through a constantly rotated element of said transmission and having a free end projecting on a line transverse to the axis of the traction wheels, and means for selectively actuating the brakes on the differential drive shafts, whereby to effect short turns of the tractor without affecting the drive to the implement shaft.

12. In a tractor, the organization comprising a frame, traction wheels and steering means supporting the respective ends of the frame, means on the frame for driving the traction wheels including a variable speed transmission and differentially driven shafts geared to the wheels, braking means for each of said drive shafts, an implement driving shaft journaled on the longitudinal center line of the frame and having a free end directed towards the traction wheels, means for driving the implement shaft from a constantly rotated element of the transmission, and means for selectively actuating the brakes on the differential drive shafts, whereby to effect short turns of the tractor without affecting the drive to the implement shaft.

In testimony whereof we affix our signatures.

EDWARD A. JOHNSTON.
PHILO H. DANLY.

frame, means on the frame for driving the traction wheels including a variable speed transmission and differentially driven shafts geared to the wheels, braking means for each of said drive shafts, an implement driving shaft journaled on the longitudinal center line of the frame and having a free end directed towards the traction wheels, means for driving the implement shaft from a constantly rotated element of the transmission, and means for selectively actuating the brakes on the differential drive shafts, whereby to effect short turns of the tractor without affecting the drive to the implement shaft.

In testimony whereof we affix our signatures.

EDWARD A. JOHNSTON.
PHILO H. DANLY.

Certificate of Correction.

Patent No. 1,641,813.      Granted September 6, 1927, to

EDWARD A. JOHNSTON ET AL.

It is hereby certified that error appears in the printed specification of the above-numbered patent requiring correction as follows: Page 3, line 72, for the misspelled word " wth " read *with;* page 6, line 85, claim 9, for the article " a " first occurrence read *the;* and that the said Letters Patent should be read with these corrections therein that the same may conform to the record of the case in the Patent Office.

Signed and sealed this 18th day of October, A. D. 1927.

[SEAL.]      M. J. MOORE,
*Acting Commissioner of Patents.*

Certificate of Correction.

Patent No. 1,641,813.  Granted September 6, 1927, to

EDWARD A. JOHNSTON ET AL.

It is hereby certified that error appears in the printed specification of the above-numbered patent requiring correction as follows: Page 3, line 72, for the misspelled word " wth " read *with;* page 6, line 85, claim 9, for the article " a " first occurrence read *the;* and that the said Letters Patent should be read with these corrections therein that the same may conform to the record of the case in the Patent Office.

Signed and sealed this 18th day of October, A. D. 1927.

[SEAL.]
M. J. MOORE,
*Acting Commissioner of Patents.*